United States Patent
Wilton et al.

(10) Patent No.: US 9,194,444 B2
(45) Date of Patent: Nov. 24, 2015

(54) PUMP DRIVE LAUNCH DEVICE ACTUATOR

(71) Applicant: GM Global Technology Operations LLC, Detroit, MI (US)

(72) Inventors: Daryl A. Wilton, Macomb, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 13/625,892

(22) Filed: Sep. 25, 2012

(65) Prior Publication Data

US 2013/0081918 A1   Apr. 4, 2013

Related U.S. Application Data

(60) Provisional application No. 61/542,587, filed on Oct. 3, 2011.

(51) Int. Cl.
```
F16D 25/06      (2006.01)
F16D 25/08      (2006.01)
F16D 43/284     (2006.01)
```

(52) U.S. Cl.
CPC ........... F16D 25/06 (2013.01); F16D 25/08 (2013.01); F16D 25/086 (2013.01); F16D 25/087 (2013.01); F16D 43/284 (2013.01); F16D 2300/24 (2013.01)

(58) Field of Classification Search
CPC ........... F16D 25/05; F16D 2048/0233; F16D 25/062; F16D 31/02
USPC ........... 192/85.5, 85.48, 85.49, 85.51, 85.57; 417/223, 316, 364; 464/168
See application file for complete search history.

(56) References Cited

U.S. PATENT DOCUMENTS

| | | | | |
|---|---|---|---|---|
| 3,360,308 A | * | 12/1967 | Grabowski et al. | 384/45 |
| 3,659,435 A | * | 5/1972 | Nilsson | 464/168 |
| 3,673,817 A | * | 7/1972 | Doran et al. | 464/168 |
| 4,255,983 A | * | 3/1981 | Yamamori et al. | 475/71 |
| 6,984,187 B2 | | 1/2006 | Biermann | |
| 6,991,578 B2 | | 1/2006 | Ziemer | |
| 7,011,597 B2 | | 3/2006 | Haka | |
| 7,018,319 B2 | | 3/2006 | Ziemer | |
| 7,325,662 B2 | * | 2/2008 | Maguire | 192/3.51 |

(Continued)

FOREIGN PATENT DOCUMENTS

| CN | 1862061 A | 11/2006 |
|---|---|---|
| DE | 2142965 B2 | 2/1981 |

(Continued)

*Primary Examiner* — Colby M Hansen

(57) ABSTRACT

A powertrain includes an engine, a transmission, a pump for providing pressurized hydraulic fluid and a launch clutch connected between the engine and the transmission for coupling the engine to the transmission when the launch clutch is in an engaged condition and for decoupling the engine from the transmission when the launch clutch is in a disengaged condition. A device is rotationally coupled to the engine and to the pump. The device is translatable along an axis between a first position and a second position. The device moves the launch clutch to the engaged condition when in the first position and does not move the launch clutch to the engaged condition when in the second position. A piston in communication with the pressurized hydraulic fluid provided by the pump is configured to translate the device along the axis between at least one of the first and second positions.

19 Claims, 1 Drawing Sheet

(56) References Cited

U.S. PATENT DOCUMENTS 7,669,497 B2 * 3/2010 Borgerson et al. .............. 74/340
2012/0178564 A1 7/2012 Vahabzadeh

FOREIGN PATENT DOCUMENTS

| DE | 102006022334 A1 | 11/2006 |
| DE | 102009030972 A1 | 1/2010 |

* cited by examiner

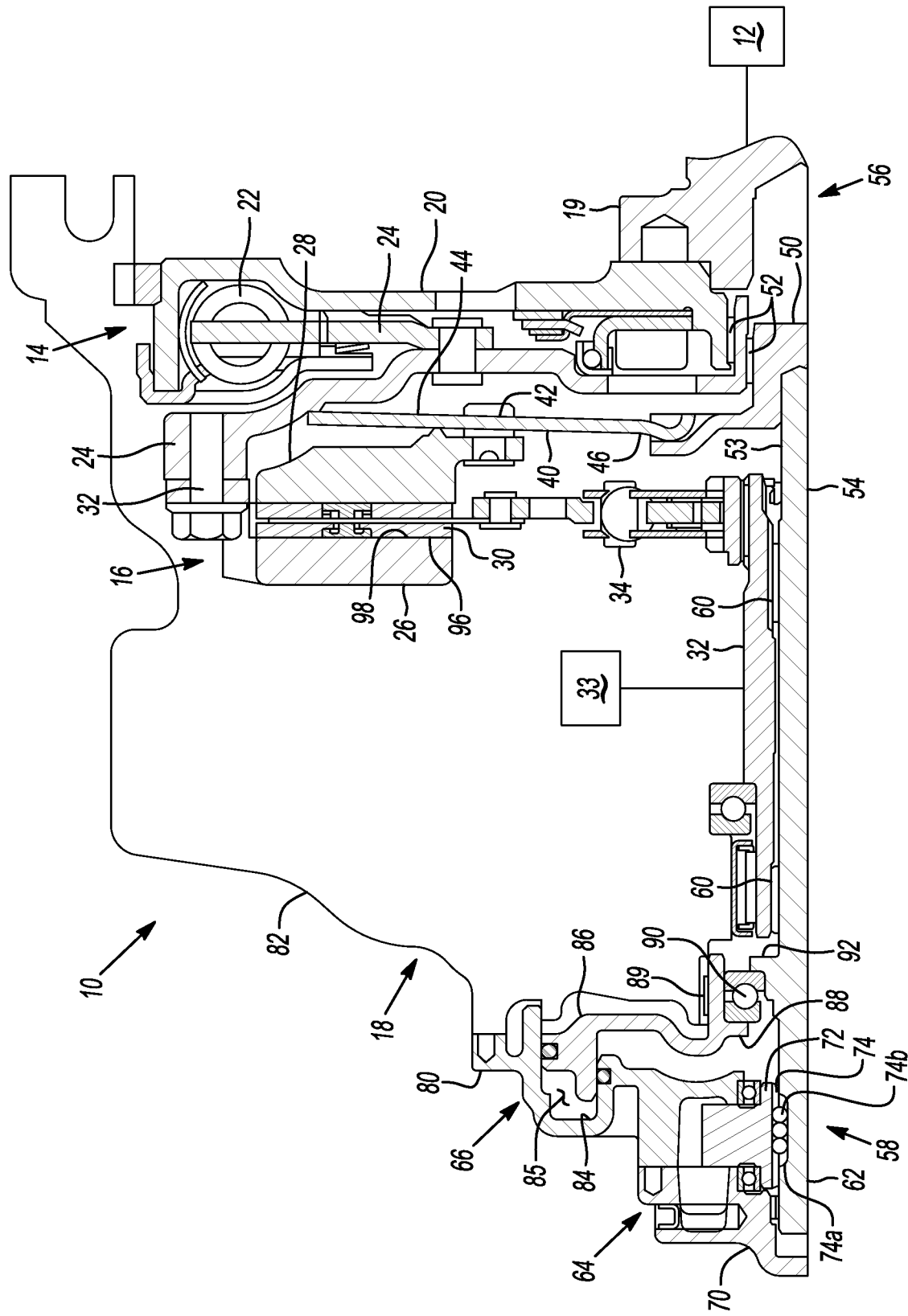

PUMP DRIVE LAUNCH DEVICE ACTUATOR

CROSS-REFERENCE

This application claims the benefit of U.S. Provisional Application No. 61/542,587 filed on Oct. 3, 2011. The disclosure of the above application is incorporated herein by reference.

FIELD

The invention relates generally to a pump drive clutch actuator, and more particularly to a pump drive clutch actuator multiplexed to a pump assembly and a launch device in a powertrain.

BACKGROUND

The statements in this section merely provide background information related to the present disclosure and may or may not constitute prior art.

A typical multi-speed automatic transmission uses a combination of torque transmitting devices, such as clutches or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the torque transmitting devices to provide the desired speed ratios.

The launch of the automatic transmission, i.e., the transfer of torque from an engine or power source to the transmission at engine start-up, is typically accomplished by a traditional torque converter that transfers torque via fluid coupling or by a wet clutch. Dry friction clutches, which exist within a transmission for normal ratio changing purposes, may also serve as launch clutches under certain conditions. However, the need to efficiently package these dry friction clutches, as well as components of the transmission including input shafts and pump assemblies, remains constant. Therefore, there is a need in the art for transmission and powertrain architecture that maximizes performance and fuel efficiency while minimizing packaging space and weight.

SUMMARY

A device for driving a pump and actuating a launch clutch in a powertrain for a motor vehicle is provided. The powertrain includes an engine, a transmission, and a launch clutch connected between the engine and the transmission for coupling the engine to the transmission when the launch clutch is in an engaged condition and for decoupling the engine from the transmission when the launch clutch is in a disengaged condition. The powertrain also includes a pump for providing pressurized hydraulic fluid. The device is rotationally coupled to the engine and to the pump. The device is translatable along an axis between a first position and a second position. The device moves the launch clutch to the engaged condition when in the first position and does not move the launch clutch to the engaged condition when in the second position. A piston in communication with the pressurized hydraulic fluid provided by the pump is configured to translate the device along the axis between at least one of the first and second positions.

In one aspect of the present invention, the device includes a shaft connected to a radial member and the shaft is rotationally coupled to the engine and to the pump and the radial member is connected to the launch clutch.

In another aspect of the present invention, the radial member is a spring plate that biases the launch clutch to the engaged condition.

In yet another aspect of the present invention, the spring plate is generally centrally pivoted by an annular pivot located on the launch clutch.

In yet another aspect of the present invention, the spring plate is secured at an inner diameter to a spring hub and the spring hub is connected to a first distal end of the shaft.

In yet another aspect of the present invention, a damper is connected between the launch clutch and the engine and the damper is supported for rotation on the spring hub by a plurality of bearings.

In yet another aspect of the present invention, the device includes an axially extended shaft having a first distal end and a second distal end, and the first distal end is connected to the launch clutch and the second distal end is connected to the pump.

In yet another aspect of the present invention, the shaft extends from a front of the transmission to a rear of the transmission.

In yet another aspect of the present invention, the transmission includes a transmission input shaft coupled to the launch device, and the transmission input shaft is supported for relative rotation on the shaft by a plurality of bearings.

In yet another aspect of the present invention, the pump includes a pump rotor connected to the second distal end of the shaft.

In yet another aspect of the present invention, a biasing member and hub are connected to the first distal end of the shaft.

In yet another aspect of the present invention, the pump rotor is coupled to the shaft by a ball splined connection that includes splines that rotationally couples the pump rotor to the shaft and bearings that allow the shaft to translate along the axis without rotationally decoupling from the pump rotor.

In yet another aspect of the present invention the piston is disposed between the pump and a rear wall of the transmission.

In yet another aspect of the present invention the piston includes a radial flange connected to an axial flange, and the axial flange contacts an apply-through bearing disposed between the piston and the device.

In yet another aspect of the present invention the device includes a shaft having a radially extended flange, and the apply-through bearing contacts the radially extended flange.

Further examples, aspects and advantages of the present invention will become apparent by reference to the following description and appended drawings wherein like reference numbers refer to the same component, element or feature.

DRAWING

The drawing described herein is for illustration purposes only and is not intended to limit the scope of the present disclosure in any way.

The drawing is a cross-sectional view of a powertrain according to the principles of the present invention.

DETAILED DESCRIPTION

The following description is merely exemplary in nature and is not intended to limit the present disclosure, application, or uses.

With reference to FIG. 1, a powertrain for a motor vehicle is generally indicated by reference number 10. The powertrain includes a prime mover 12 drivingly coupled to a damper 14 which in turn is drivingly coupled to a launch device 16 and a transmission 18. The prime mover 12 provides an output torque through the damper 14 and the launch device 16 to the transmission 18. The prime mover 12 is, for example, an internal combustion gas, Diesel or flex-fuel engine or an electric motor. The prime mover 12 includes a crankshaft 19 which is secured to a circular input plate 20 of the damper 14. The circular input plate 20 is coupled through damper members 22 to a circular output plate 24 of the damper 14.

The launch device 16 is a dry clutch launch device that receives drive torque from the circular output plate 24 of the damper 14. The launch device 16 includes a first friction plate or backing plate 26, a second friction plate or pressure plate 28, and a hub plate or clutch disk 30 disposed between the backing plate 26 and the pressure plate 28. The backing plate 26 is rigidly coupled to the output plate 24 of the damper 14 via fixed connections 32. The clutch disk 30 is connected for rotation with a transmission input member 32. The transmission input member 32 is coupled to a gear and clutch arrangement schematically indicated by reference number 33. It should be appreciated that any number of clutches, brakes, gear sets, and shafts or members may be arranged in the gear and clutch arrangement 33 without departing from the scope of the present invention. An optional damping element 34 may be disposed between the clutch disk 30 and the input member 32 to absorb engine vibrations. The pressure plate 28 is secured to a diaphragm spring or spring plate 40 via a retainer 42. The spring plate 40 is generally centrally pivoted by annular pivot 44 located on the pressure plate 28. The spring plate 40 normally biases the pressure plate 28 in contact with the clutch disk 30 to engage the clutch disk 30 with the backing plate 26.

The spring plate 40 is secured at an inner diameter 46 to a spring hub 50. Both the input plate 20 and the output plate 24 of the damper 14 are supported for rotation on the spring hub 50 via bearings 52. The spring hub 50 is rotationally fixed to a distal end 53 of a pump drive/launch device apply actuator or shaft 54. The shaft 54 extends from a front 56 of the transmission 18 to a rear 58 of the transmission 18. The transmission input shaft 32 is supported for relative rotation on the shaft 54 via bearings 60, thereby making the transmission input shaft 32 a sleeve shaft (i.e. concentric with the shaft 54).

The shaft 54 is coupled at a second distal end 62 to a pump assembly 64 and a launch clutch actuation device 66. The pump assembly 64 generally includes a pump body 70 having a pump rotor 72. The pump rotor 72 is rotationally splined to the shaft 54 via a ball splined connection 74. The ball splined connection 74 includes splines 74A for rotationally coupling the pump rotor 72 to the shaft 54 as well as ball bearings 74B for permitting the shaft 54 to move axially with respect to the pump assembly 64.

The launch clutch actuation device 66 includes a housing 80 sealingly engaged to the pump body 70 and to a transmission case 82 of the transmission 18. The housing 80 includes a cylinder 84 concentrically disposed about the shaft 54 that defines a cylinder chamber 85. A piston 86 is slidably disposed within the cylinder 84. The piston 86 is axially translatable via control of hydraulic fluid within the cylinder chamber 85. For example, the cylinder chamber 85 may be filled with transmission fluid under control by a transmission control unit (not shown), as will be well understood by those skilled in the art, to extend or retract the piston 86. The piston 86 includes an inner edge or flange 88 and an axial flange 89 that contacts an apply-through bearing 90. The apply-through bearing 90 also contacts a radially extending flange 92 located on the shaft 54, thereby axially and radially sandwiching the apply-through bearing 90 between the piston 86 and the shaft 54.

As described above, the backing plate 26 and the damper 14 are all connected for rotation with the crankshaft 19 and therefore rotate at the same speed as the engine 12. Output torque from the engine 12 is transmitted to the transmission 18 and the pump assembly 64 by engaging the launch device 16, thereby rotationally coupling the backing plate 26 to the clutch disk 30 and the pressure plate 28. For example, when the launch clutch actuator assembly 66 is controlled to extend the piston 86 toward the clutch disk 30, the piston 86 moves the apply-through bearing 90 towards the shaft 54. The shaft 54 is translated axially towards the launch device 16 without being rotationally decoupled from the pump rotor 72. Axial movement of the shaft 54 compresses the spring plate 40 to release the pressure plate 28 from the clutch disk 30 and thereby disengage the clutch disk 30 from the backing plate 26. The spring plate 40 moves the pressure plate 28 axially via the retainer 42. Conversely, when the launch clutch actuator assembly 66 is controlled to retract the piston 86 within the cylinder 84, the apply-through bearing 90 moves axially away from the shaft 54. The spring plate 40 is able to pivot and axially translate the shaft 54 towards the pump assembly 64. In addition the spring plate 40 pivots at the annular pivot 44 to move the pressure plate 28 into contact with the clutch disk 30. A friction surface 96 of the clutch disk 30 then comes into contact with an opposing adjacent friction surface 98 of the backing plate 26, thereby rotationally coupling the output of the engine 12 to the transmission input shaft 32 and the shaft 54. Notably, the frictional contact between the adjacent friction surfaces 96, 98 is not lubricated; thus, the heat of frictional contact is dissipated by the pressure plate 28 and the damper 14. Lubrication fluid is not required for cooling the friction surfaces 96, 98. Thus, associated spin losses and pumping losses are not encountered.

The shaft 54 allows the pump assembly 64 to be packaged on the rear 58 of the transmission 18 where it has easy access to the oil sump (not shown) and transmission controls system (not shown), resulting in a small drive radius and higher pump efficiency. In addition, the multiplexing of the shaft 54 to the pump assembly 64 and the launch clutch actuator assembly 66 results in a reasonably sized transmission input shaft 32 that does not significantly enlarge the gearsets of the transmission 18.

The description of the invention is merely exemplary in nature and variations that do not depart from the gist of the invention are intended to be within the scope of the invention. Such variations are not to be regarded as a departure from the spirit and scope of the invention.

The following is claimed:

1. A powertrain comprising:
   an engine;
   a transmission having a transmission input shaft;
   a launch clutch connected between the engine and the transmission input shaft for coupling the engine to the transmission when the launch clutch is in an engaged condition and for decoupling the engine from the transmission when the launch clutch is in a disengaged condition;
   a pump for providing pressurized hydraulic fluid;
   a device rotationally coupled to the launch clutch and to the pump, wherein the device is translatable along an axis between a first position and a second position, wherein the device moves the launch clutch to the engaged condition when in the first position and does not move the launch clutch to the engaged condition when in the second position, and wherein the transmission input shaft is supported for rotation on the device;

a piston in communication with the pressurized hydraulic fluid provided by the pump and configured to translate the device along the axis between at least one of the first and second positions.

2. The powertrain of claim 1 wherein the device includes a shaft connected to a radial member, wherein the shaft is rotationally coupled to the pump and the radial member is connected to the launch clutch.

3. The powertrain of claim 2 wherein the radial member is a spring plate that biases the launch clutch to the engaged condition.

4. The powertrain of claim 3 wherein the spring plate is generally centrally pivoted by an annular pivot located on the launch clutch.

5. The powertrain of claim 4 wherein the spring plate is secured at an inner diameter to a spring hub and wherein the spring hub is connected to a first distal end of the shaft.

6. The powertrain of claim 5 further comprising a damper connected between the launch clutch and the engine, and wherein the damper is supported for rotation on the spring hub by a plurality of bearings.

7. The powertrain of claim 1 wherein the device includes a shaft that is axially extended and has a first distal end and a second distal end, and wherein the first distal end is connected to the launch clutch and the second distal end is connected to the pump.

8. The powertrain of claim 7 wherein the shaft extends from a front of the transmission to a rear of the transmission.

9. The powertrain of claim 7 wherein the transmission input shaft is supported for relative rotation on the shaft by a plurality of bearings.

10. The powertrain of claim 7 wherein the pump includes a pump rotor connected to the second distal end of the shaft.

11. The powertrain of claim 10 further comprising a biasing member and hub connected to the first distal end of the shaft.

12. The powertrain of claim 11 wherein the pump rotor is coupled to the shaft by a ball splined connection that includes splines that rotationally couples the pump rotor to the shaft and bearings that allow the shaft to translate along the axis without rotationally decoupling from the pump rotor.

13. The powertrain of claim 1 wherein the piston is disposed between the pump and a rear wall of the transmission.

14. The powertrain of claim 13 wherein the piston includes a radial flange connected to an axial flange, and wherein the axial flange contacts an apply-through bearing disposed between the piston and the device.

15. The powertrain of claim 14 wherein the device includes a shaft having a radially extended flange, and wherein the apply-through bearing contacts the radially extended flange.

16. A powertrain comprising:

an engine having an engine output shaft:

a transmission having a transmission input shaft;

a launch clutch connected between the engine output shaft and the transmission input shaft for coupling the engine to the transmission when the launch clutch is in an engaged condition and for decoupling the engine from the transmission when the launch clutch is in a disengaged condition;

a pump having a pump rotor;

a spring plate connected to the launch clutch that biases the launch clutch to the engaged condition;

a shaft rotationally coupled to the pump rotor and to the spring plate, wherein the shaft translates against the bias of the spring plate to move the launch clutch to the disengaged condition;

a spring hub connected to the shaft and to the spring plate;

a damper connected between the launch clutch and the engine, and wherein the damper is supported for rotation on the spring hub by a plurality of bearings; and an actuator configured to translate the shaft.

17. The powertrain of claim 16 wherein the spring plate is secured at an inner diameter to the spring hub and wherein the spring hub is connected to a first distal end of the shaft.

18. The powertrain of claim 17 wherein the shaft is connected to the pump rotor at a second distal end of the shaft.

19. The powertrain of claim 18 wherein the pump rotor is coupled to the shaft by a ball splined connection that includes splines that rotationally couples the pump rotor to the shaft and bearings that allow the shaft to translate along the axis without rotationally decoupling from the pump rotor.

\* \* \* \* \*